United States Patent [19]

Nelson et al.

[11] Patent Number: 4,947,459

[45] Date of Patent: Aug. 7, 1990

[54] FIBER OPTIC LINK NOISE MEASUREMENT AND OPTIMIZATION SYSTEM

[75] Inventors: Larry A. Nelson; James W. Woods, both of Albuquerque, N. Mex.

[73] Assignee: Honeywell, Inc., Minneapolis, Minn.

[21] Appl. No.: 275,935

[22] Filed: Nov. 25, 1988

[51] Int. Cl.$^5$ ............................................. H04B 10/00
[52] U.S. Cl. .................................... 455/612; 455/600; 455/617
[58] Field of Search ............... 455/600, 601, 606, 607, 455/608-613, 617-619; 370/1-4; 356/73.1

[56] References Cited

U.S. PATENT DOCUMENTS 4,637,072  1/1987  Hellstrom .......................... 455/612

FOREIGN PATENT DOCUMENTS

| | | | |
|---|---|---|---|
| 3340428 | 5/1985 | Fed. Rep. of Germany | 455/608 |
| 0096040 | 5/1985 | Japan | 455/600 |
| 0139036 | 7/1985 | Japan | 455/600 |
| 0144031 | 7/1985 | Japan | 455/619 |
| 0144032 | 7/1985 | Japan | 455/600 |
| 0039935 | 2/1987 | Japan | 455/612 |
| 0095034 | 5/1987 | Japan | 455/619 |
| 1007208 | 3/1983 | U.S.S.R. | 455/619 |

Primary Examiner—Joseph A. Orsino
Assistant Examiner—L. Van Beek
Attorney, Agent, or Firm—Haugen and Nikolai

[57] ABSTRACT

Apparatus for optimizing system performance for use in a transmission and signal distribution system which includes at least one fiber optic link having transmission and receiving means. The apparatus includes apparatus for measuring noise signals in each fiber optic link and apparatus for generating system performance data corresponding to the noise signals measured by the noise measurement apparatus.

2 Claims, 5 Drawing Sheets

FREQUENCY-MODULATION SYSTEM WITH CONVENTIONAL DEMODULATOR ary of the invention
FIBER OPTIC LINK NOISE MEASUREMENT AND OPTIMIZATION SYSTEM This invention relates to communication systems for routing and distributing transmission signals and, more particularly, to a fiber optic transmission system noise measurement and optimization system.

BACKGROUND OF THE INVENTION

Known fiber optic transmission systems have several inherent disadvantages. For example, known LED transmitters in transmission systems using fiber optic links are constructed to launch the amount of optical power required for worst case conditions. Typically, worst case conditions for such optical systems are computed using worst case receiver sensitivity, worst case LED optical power output, operation at worst case temperature and operation at worst case connector and film loss. Designing for such worst case conditions results in the launching of excess optical power (whenever conditions on a particular link are not worst case) which, in turn, results in an excess of dissipated power by the LED. Operating the LED at such continued high optical power results in an excessive amount of heat generated and may degrade LED performance over a period of time (as compared to operating at lower power levels).

Another disadvantage of known systems is that they provide little or no information with respect to connector performance in most applications. Further, knowledge of system expected power margins is uncertain due to the lack of information relating to installed connector performance. The availability of such information is particularly important in an airborne system.

Known systems are, for the most part, non-linear digital systems. Unlike the invention described herein, such known systems cannot measure noise performance in a fiber optic transmission and distribution system and relate such performance to power margins. This is because the relationship between noise power and bit error rate changes too rapidly near the threshold of transmission system operation. Presently, known systems simply transmit as much power as possible during any transmission. Maintenance of such systems is typically done only after a link in the system fails to operate.

The invention overcomes the disadvantages of prior art devices by providing, for the first time, apparatus which measures system noise performance and uses this information in one illustrative embodiment to control the amount of power launched or transmitted by an LED transmitter. As provided by the invention, an LED or laser transmitter launches only the amount of optical power required to maintain an adequate signal-to-noise ratio at the demodulator (discriminator) output. Reducing the launched power reduces the power dissipation of the transmitter and improves its reliability. Noise measurement results are also used by the invention to optimize transmission network route selection, and according to need (based upon measurements) do maintenance of the fiber optic transmission system only as required. Such maintenance can frequently be done prior to complete failure of optical fiber links. That is, the system employing the invention will transmit at a power level corresponding to actual conditions present in the system whereas known systems transmit at much higher power levels corresponding to "worst case" power loss calculations.

Optimization of receiver operating conditions can also be done if an Avalanche Photo Diode (APD) is used for an optical detector by using noise measurements to optimize APD gain. Conventionally, APD detectors use temperature compensated drive systems of the tightly regulated high voltage drive to control and optimize the avalanche gain of the devices.

SUMMARY OF THE INVENTION

Apparatus for optimizing system performance for use in a transmission and signal distribution system which includes at least one fiber optic link having transmission and receiving means is disclosed. The apparatus includes means for measuring noise signals in each fiber optic link and means for generating system performance data corresponding to the noise signals measured by the noise measurement means.

In one alternate embodiment of the invention, means for controlling the transmission and signal distribution system is included wherein the controlling means responds to the generated performance data.

In yet another alternative embodiment of the invention, means for routing signals based upon optical path loss is also included. The apparatus of the invention may further include means for storing generated performance data and means for transmitting input signals at variable transmission power levels as determined by the generated performance data.

It is one object of the invention to provide apparatus which overcomes the disadvantages in the prior art by measuring system noise performance in a transmission and distribution system having fiber optic links and using such system noise measurement results to control the amount of optical power launched by the system's transmitter.

It is a further object of the invention to provide apparatus to improve fault detection capability in fiber optic link systems by recognizing the relationship between system noise performance and fiber optic link loss performance.

It is yet another object of the invention to provide signal route selection made on the basis of optical path loss for better transmission of signals or to enable using lower transmitter power by selecting the lowest noise links in a system.

It is yet a further object of the invention to optimize Avalanche Photo Diode Receiver Operating Conditions by employing noise measurements to adjust APD gain.

It is yet another object of the invention to provide information related to transmitter power, fiber optic link loss, and receiver sensitivity by using noise measurements of a fiber optic link transmission circuit.

It is yet a further object of the invention to optimize transmitter power so as to prevent operation of transmitters for worst case conditions unless the conditions present are in actuality worst case.

Other objects, features and advantages of the invention will become apparent to those skilled in the art through reference to the accompanying claims and drawings wherein like numerals refer to like elements.

DETAILED DESCRIPTION OF THE PREFERRED EMBODIMENT

Figure 7:
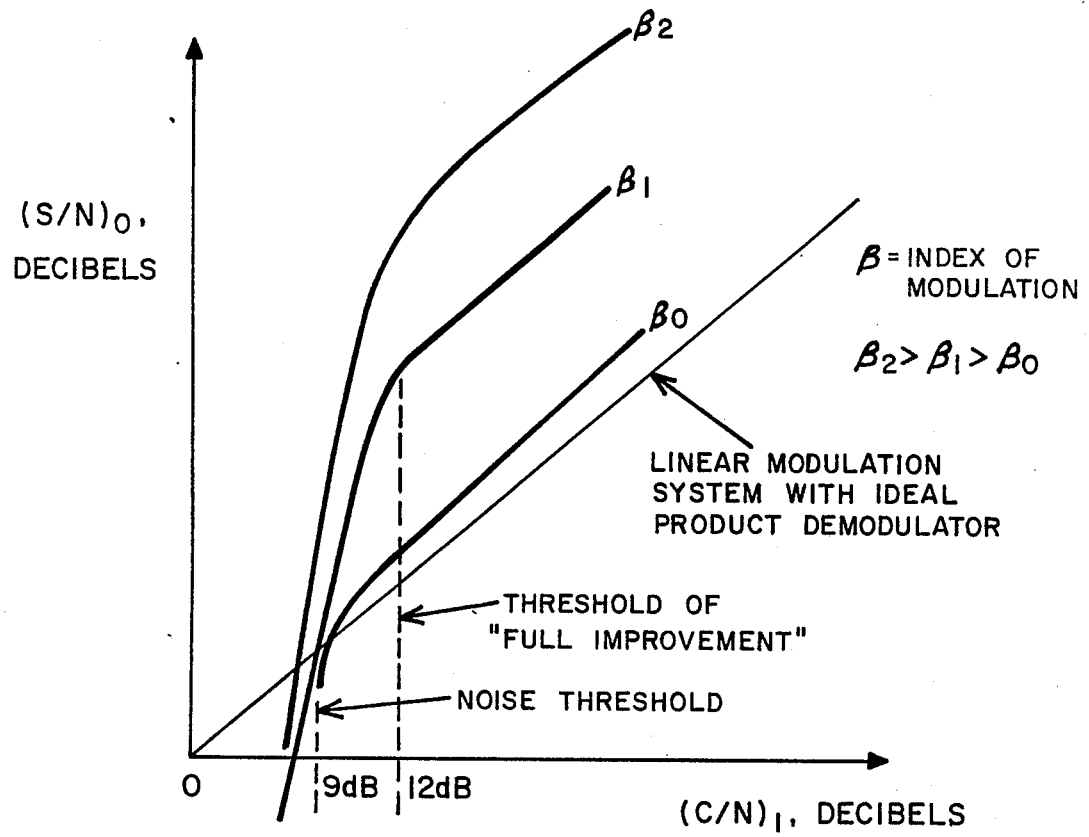
FIG. 7 is a graphical plot of the noise performance of a conventional FM demodulator.
Figure 8:
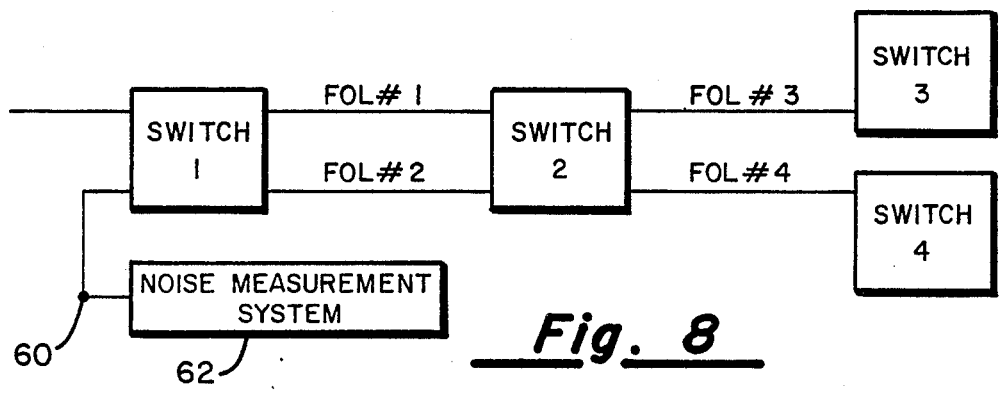
FIG. 8 is a block diagram of an illustrative example of a hypothetical switched network using the noise measurement system of the invention.

Before discussing in detail the elements which comprise the invention, it is important to lay some foundation for the discussion of the invention by pointing out some important conventional FM characteristics which lead to the theoretical basis for the invention. FIG. 7 illustrates the relationship between demodulated output signal-to-noise (vertical axis) and FM input carrier-to-noise (C/N) in a conventional FM system (horizontal axis). The carrier-to-noise ratio for a particular transmission channel is dependent on transmitted optical power in the conventional FM system. As transmitted optical power increases, carrier-to-noise also increases and the total noise power measured at the base-band (demodulated) output of the transmission system decreases. For a particular transmission channel, there exists a minimum signal-to-noise (S/N) requirement. For many types of transmission systems (e.g., television), the input/output signal levels are defined, thus the noise generated on the transmission channel controls the signal-to-noise relationship. The requirements for total noise can be determined either by measurement at several frequencies or apriori knowledge of the output noise power spectrum shape. For example, FM without pre-emphasis produces an upper triangular noise power spectrum.

Figure 1:
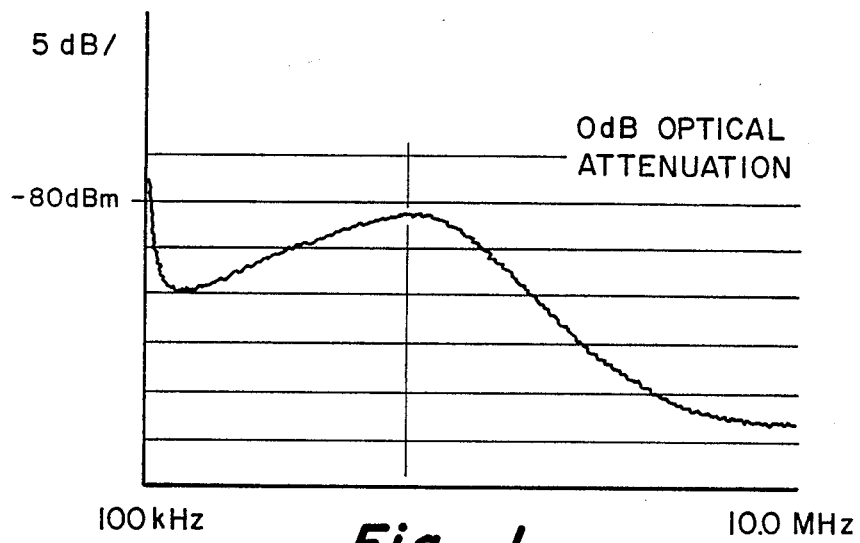
FIG. 1 is a graphical plot of random noise as measured in an FM fiber optic link system with zero dB of optical attenuation.
Figure 2:
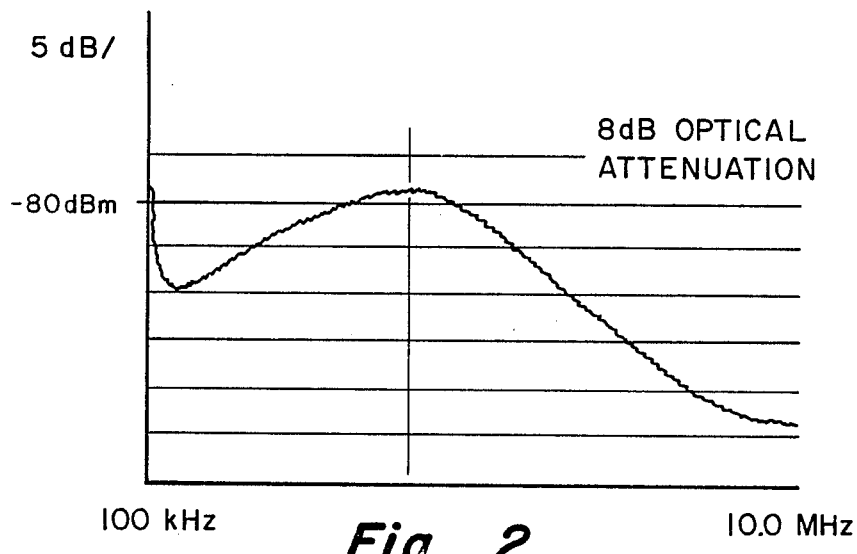
FIG. 2 is a graphical plot of random noise as measured in an FM fiber optic link with 8 dB of optical attenuation.
Figure 3:
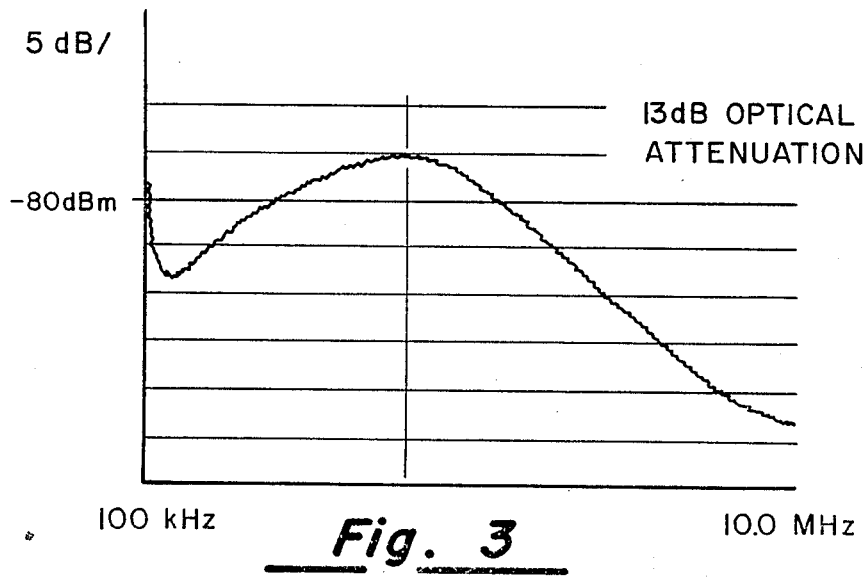
FIG. 3 is a graphical plot of random noise in an FM fiber optic link with 13 dB of optical attenuation.

In addition to measuring total noise power, the shape of the noise power spectrum may also yield significant information. While the high carrier power condition has a noise floor determined by the modulation and demodulation circuitry, the low carrier power condition in a fiber optic transmission system has a significant noise power contribution from the fiber optic PIN diode receiver. The receiver has a different shape noise power spectrum than the modulation and demodulation system. An example of this shape change can be seen in FIGS. 1, 2 and 3 which are examples of actual measured noise power spectrums as measured by Honeywell Inc., Defense Avionic Systems Division, Albuquerque, N. Mex. FIGS. 1, 2 and 3 depict the output noise power spectrum for different carrier-to-noise Conditions. The invention recognizes, for the first time, that this power spectrum shape change is an important diagnostic and loop control tool because the noise spectrum changes more rapidly near the system power margin limit (i.e., the FM threshold or threshold of "full improvement" of FIG. 7).

Referring to FIG. 7, one can see that for the same transmitted carrier power (C/N), different demodulated signal-to-noise ratio results are obtained, depending upon the index of demodulation $\beta$. In general, for higher $\beta$ a higher signal to noise is obtained. $\beta$ also determines the bandwidth of the FM carrier signal. Thus, it is possible to trade bandwidth for transmitted power. This is conventionally done in satellite FM transponders. For a particular index of modulation, higher transmitted power yields higher demodulated signal to noise, or for a given signal power at the output, less noise is acquired in the transmission of the signal. FIG. 7 shows that at low carrier-to-noise conditions, a small increase in C/N produces a large increase in S/N. Past a threshold value, the output noise is linearly proportional to input carrier power. This relationship is different than digital systems where a very small change in C/N can produce orders of magnitude change in output Bit Error Rate (a measure of digital system noise after clocking of the data).

The invention recognizes, for the first time with application to a fiber optic link system, that through measurement of noise one can infer the power output of the system's transmitters and loss of the transmission system. The only test signal required for making those determinations is the noise already present in the system. This is true because noise power in a fiber optic link is always random noise and is entirely determined by the amount of power in the system. It will be random noise because of the nature of the noise generators. This is not true for other types of transmission systems, such as coaxial line transmission systems, because other, non-random, noise sources can be coupled into the system through electromagnetic signal coupling.

Having described the theoretical basis for the invention, we now turn to a detailed description of the embodiment of the invention.

Figure 6:
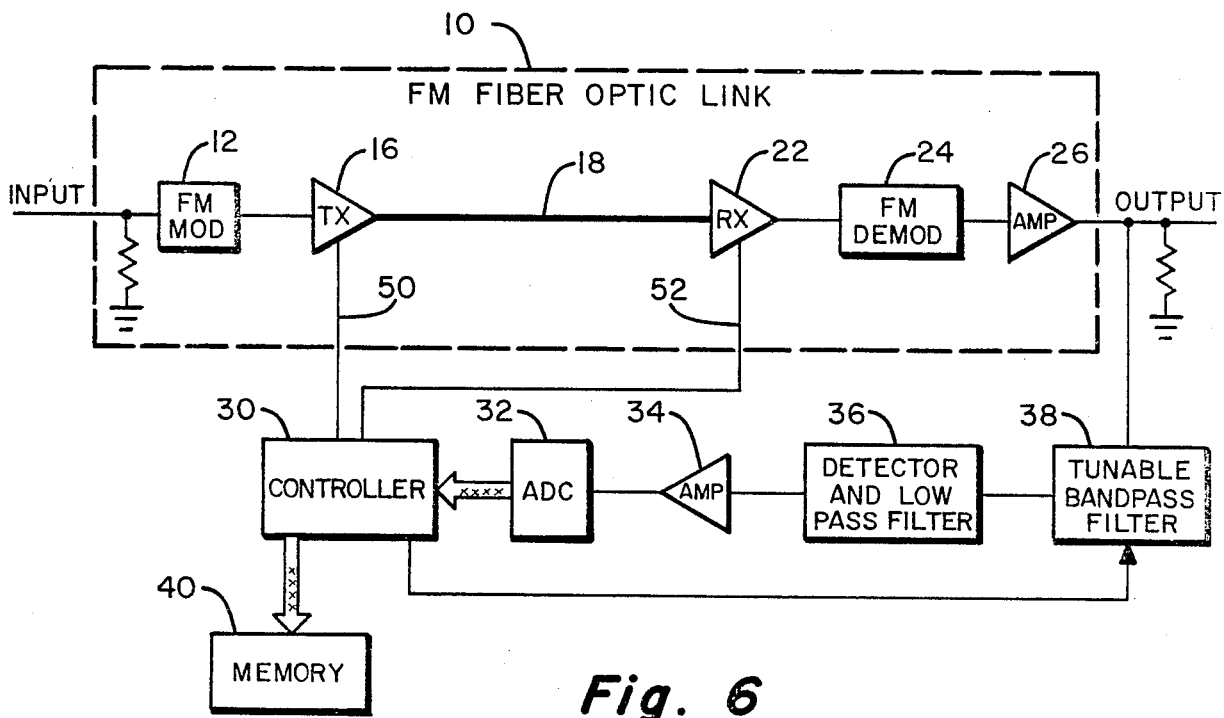
FIG. 6 is a block diagram illustrating one embodiment of the invention for noise measurement and control of transmitter power for a fiber optic link.

As shown in FIG. 6, a system was designed to measure noise power at the base-band output of an FM optical transmission system. The system comprises a fiber optic link 10 including an FM modulator 12 which is electrically connected to a transmitter 16. The transmitter 16 may be preferably an LED, a laser, or other electro-optic modulating device having variable output power. Further, the transmitter 16 receives an electrical signal from the FM modulator 12 and transmits a light amplitude signal which is equivalent to the electrical signal received from the FM modulator. The light amplitude signal out of the transmitter 16 is carried by fiber 18 to the input of receiver 22. Receiver 22 converts the light signal to an equivalent electrical signal and adds gain to make the electrical signal larger. It is at the input to receiver 22 that the lowest level signal in this system is found. Receiver 22 also adds most of the noise to the system. In one embodiment of the invention constructed by Honeywell Inc., the transmitter 16 was an 870 nanometer transmitter of Type ODL-50 (and a modified device providing for variable LED drive) and the receiver was an ODL-50 receiver which is available as a standard part from AT&T Technologies Company. Those skilled in the art will recognize that other equivalent components and circuits are available to perform the functions described herein in a variety of configurations. This description is meant to serve only as an illustrative example of one embodiment of the invention for the purposes of describing the invention.

Still referring to FIG. 6 and further describing the fiber optic link, an FM demodulator 24 receives the electrical signal output from the receiver 22 and demodulates the signal to recover the input signal plus the noise introduced by the system. This demodulated signal is fed via an electrical connection to amplifier 26, the last element in the link, which increases the signal gain to a more usable level and conditions the signal to have an output impedance which is compatible with the tunable bandpass filter 38.

The noise signal emerging from the tunable bandpass filter has no dc information. That is, it has zero average value regardless of the noise signal power which it contains. Passing this signal through a detector produces a uni-directional flow of current whose mean value is a measure of signal strength. The particular properties of the output will depend upon the input signal characteristics and the characteristics of the detector. For a simple square law detector, sum and difference frequencies arise at the detector output. The noise power of the signal is thus distributed spectrally at baseband. To recover a measure of the input signal average power, a low pass filter is applied to the spectrum at the detector output. The smaller the bandpass of the low pass filter, the smaller the fluctuations in signal output will be and therefore the smaller the uncertainty of the measured average noise power. Of course, as the bandpass of the low pass filter decreases, more time is required to average fluctuations so they have zero value. Thus, there is a time of measurement consideration in designing a noise measurement system.

Other information about the particular characteristics of the recovered noise signal are also available, but recovering them would require special (not necessarily low pass) filters. Because fiber optic systems are random noise limited, we may expect to know apriori the quality of noise and are mostly interested in the quantity of noise. The particular question is how accurate we can make the measurement of average noise power.

The accuracy of measuring noise power is discussed by Ron Bracewell in *The Fourier Transform and Its Applications*, Chapter 16, Second Edition Revised. The accuracy limitation developed by Bracewell is the ratio of rms noise fluctuation to the mean of the detected noise signal. This ratio can be made arbitrarily small by limiting the bandwidth of the tunable bandpass filter, and the amount of averaging of the detected output signal (i.e., the low pass filter bandwidth as best shown in FIG. 6).

Tunable bandpass filter 38 may be any conventional tunable bandpass filter which selects out those frequencies required for system noise measurements. As those skilled in the art can appreciate, particularly by reference to sample FIGS. 1, 2 and 3, those frequencies which are desirable depend upon the FM fiber optic transmission system being employed. Some frequencies, as shown in FIGS. 1, 2 and 3 and by comparison thereof, show a more sensitive change in random noise power than others, resulting in more sensitive and, therefore, more accurate measurement of the change in noise. Precisely which frequency will give the best results depends upon the pre-emphasis and de-emphasis circuits used in a typical FM system. (These circuits are not shown but are well known in the art.)

Still referring to FIG. 6, the output of the tunable bandpass filter 38 is fed into the detector and low pass filter block 36. The tunable bandpass filter determines the bandwidth and center frequency of the noise power to be measured. The center frequency of the bandpass filter may be tuned to a frequency where the index of modulation is small for maximum sensitivity, or the total power spectrum of the noise signal can be measured by iteratively measuring the noise at different frequencies. The output of the detector and low pass filter is then fed through an amplifier 34 to an analog-to-digital converter 32. One skilled in the art will recognize that the analog-to-digital converter 32 is not critical to the invention herein but is advantageously employed in this illustrative example of the invention as a means to conveniently manipulate system noise performance information. From the analog-to-digital converter 32, the system performance noise information is fed to controller 30.

The controller uses the information on the amount of received noise power by comparing it to a selected value at which the system is designed to be operated. The amount of noise which is allowed compared to the amount of noise which is received allows for optimization of either signal quality (lower noise transmission) or power dissipation in the emitting device (which corresponds to reliability and life). Consider, for example, a system which uses this transmission media for the transmission of digital data as for example is done with a modem over the switched telephone network. The modem requires a certain bandwidth and signal to noise in the transmission channel to transmit with a particular bit error rate (BER). Increasing transmitted power beyond what is required to obtain this BER produces a generally useless improvement in BER because the BER already represents essentially perfect transmission. In this instance, the controller would probably decrease the transmitted power until it was just sufficient to maintain the transmission noise characteristics required. In another application, such as the transmission of video, there may be particular interest in a lower noise image. In this case, the improvement which may be obtained from higher power transmission is noticeable but produces diminishing returns beyond a certain signal to noise. The controller might pick an intermediate operating condition so as to obtain better signal quality, but with improved LED lifetime and reduced power dissipation. Because the output optical power of LED devices is expotentially related to input current, there is substantial opportunity for improvement with small decreases in the amount of optical power required. Because all fiber optic systems are designed to have some power margin, this power reduction capability should be commonly available.

The controller 30 may be any type of intelligent controller such as a microcomputer, CPU or custom designed logic circuit. In one embodiment of the invention, controller 30 also may optionally include LED drive line 50. In operation, the LED drive line 50 would control the power output level of the transmitter based upon noise performance measurements received by the controller. In yet another embodiment of the invention, the controller may also include a high voltage APD control line 52 for controlling the output voltage of the receiver 22. As shown in FIG. 6, one embodiment of the invention may also optionally include a memory device 40 for storing historical noise measurement data. Such a memory device may be used to track system performance as well as to provide information on individual links which could be used by an operator desiring to select, for example, the lowest noise link in a system of fiber optic links. By checking the information stored in the memory unit for each fiber optic link in the system, if one were looking for a link, for example, to put out a low noise signal at low power, one could check the noise performance parameters for each link in the system selecting the link with the best set of parameters.

Figure 13:
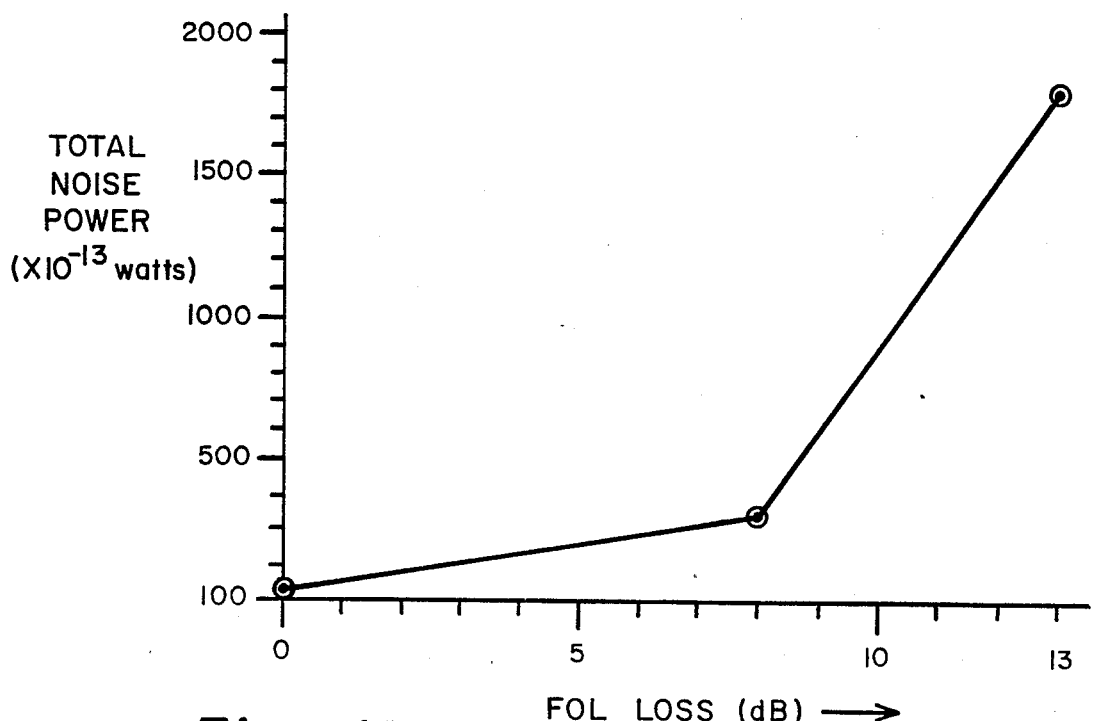
FIG. 13 is a graphical plot of the effect of fiber optic link loss on measured noise power.

In operation, the system shown in FIG. 6 accomplishes the required noise power spectrum measurements by first bandlimiting the output noise signal from the amplifier 26, then converting it into voltage which corresponds to the time averaged noise power in the bandlimited noise signal, which is the output of detector and low pass filter 36. The voltage corresponds to the noise power in a particular frequency band with a frequency as indicated by the power spectrum measurements of an actual channel, as shown in FIGS. 1, 2 and 3. As transmitted optical power is increased, the output voltage will vary as shown in FIG. 13, which is based upon data taken from FIGS. 1, 2 and 3. This voltage is digitized and passed to the controller 30. In one embodiment of the invention, the controller 30 may adjust the LED drive current at the transmitter 16 to increase or decrease the optical output power to obtain the desired noise level at the output of the fiber optic link 10. Since the system will not normally operate at worst case conditions, the optical output power of the transmitter can be reduced to a level compatible with the current operating conditions of the fiber optic link. This reduces the amount of power required by the transmitter 16.

Another feature of the invention's noise measurement circuit is the ability to determine the operating power margins of each fiber optic link in a network of fiber optic links. These operating margins are determined by the optical power needed to obtain a given signal-to-noise compared to the optical power available. By recording the results of noise power measurements in memory for several fiber optic links at selected time intervals, system operation and maintenance may be enhanced. Storing the performance of each FOL in a network of FOLs provides for accumulation of a performance history that can be correlated to flight conditions and maintenance actions. Thus, maintenance requirements can be accurately predicted. Where ineffective maintenance has occurred, the need for additional effort can be indicated. Also the time history of performance of the link can help to indicate the nature of the current problem. For example, slowly increasing noise might indicate aging of the LED transmitter whereas an abrupt change in performance would indicate an external action upon the system (e.g. dirt introduced into a connector pair during a demating/mating operation).

Another example of controller application is to improve operating performance by using measured noise power levels of alternate transmission paths to select the path which provides the lowest noise power. Alternatively, system reliability may be enhanced by selecting the lower noise path and reducing launched optical power, therefore, minimizing LED power dissipation (i.e., junction temperature). To improve maintenance, links are prioritized for maintenance according to their remaining power margins. Thus, a fiber optic link whose connectors have been contaminated by scoring or dirt will be flagged automatically for maintenance because of an increase in LED (or other optical driver with modulable power outputs such as a laser) drive current required to obtain a constant signal-to-noise ratio.

By measuring noise on transmission links successively, noise measurements on entire transmission systems can be performed using a noise measurement system located only in one location. An illustrative example of this method is shown in FIGS. 8 through 12. For example, to compute the noise power associated with each of the full duplex fiber optic links shown in the switched network of FIG. 8, one can proceed as described below.

Figure 9:
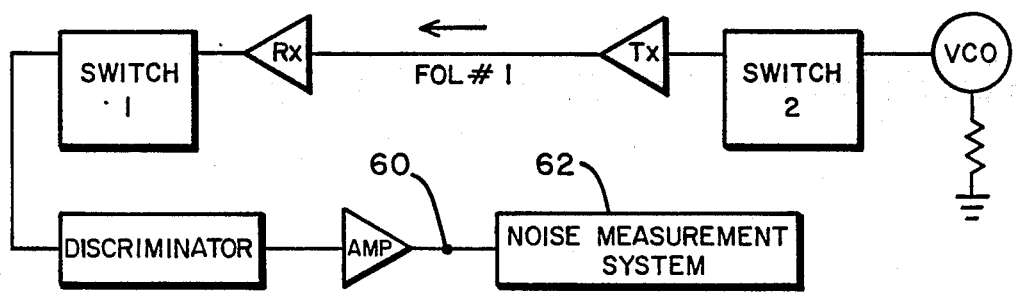
FIG. 9 is a block diagram illustrating one example of an application of the noise measurement system of the invention for determining noise power in a fiber optic link.

1. Measure the noise for FOL #1 with an LED transmitter located at switch 2 and a receiver located at switch 1 by terminating the input of a voltage controlled oscillator (VCO) and driving FOL #1 as shown in FIG. 9.

Figure 10:
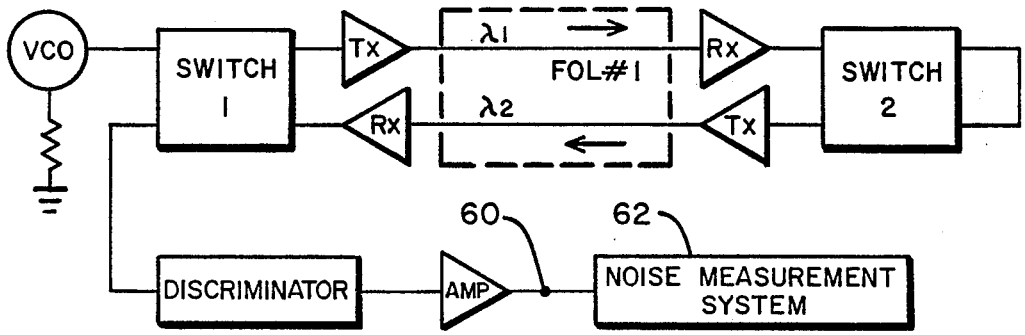
FIG. 10 is a block diagram illustrating the measurement of composite noise of multiple transmission paths and computation of noise for a single portion of that multiple transmission path using the noise measurement system of the invention.

2. As shown in FIG. 10, a signal may then be sourced at switch 1 which traverses FOL #1 from switch 1 to switch 2. The signal is then looped back on the same link. Measured noise in step 1 was on this link and in this direction of transmission. Next, the total noise is measured as shown in FIG. 10 and as given by the equation:

Measured Noise Power = NFOL1L + NFOL1R where NFOL1L is the noise power in fiber optic link number 1 when transmitting from switch 2 to switch 1 and NFOL1R is the noise power in fiber optic link number 1 when transmitting from switch 1 to switch 2. When the noise contributed from the link measured in step 1 is subtracted from the noise contributed by the link in step 2, the noise of the link under test is obtained. Those skilled in the art will appreciate that some apriori knowledge of the noise characteristics of the modulator and demodulator used in this process will enhance accuracy.

3. FOL #2 can be tested similarly to FOL #1 using Voltage Controlled Oscillators (VCOs) at switch 2 and switch 1 or it can be tested using a VCO source at switch 1 only by using FOL #1 as a known noise communications link.

Figure 11:
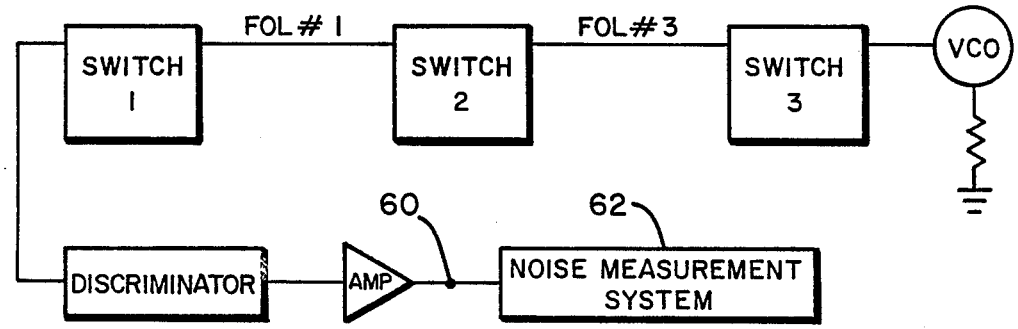
FIG. 11 is a block diagram illustrating one example of noise measurement for a fiber optic link in series with a fiber optic link having a previously measured noise characteristic which is connected to the output of the noise measurement system of the invention.

4. Testing FOL #3 requires a VCO at switch 3 as shown in FIG. 11. The method is similar to measurement of FOL #1 for a transmitter at switch 2 and a receiver at switch The total noise power measured minus the noise power contributed by FOL #1 is the noise at FOL #3. The opposite direction of transmission on FOL #3 is measured similarly to the transmission from switch 1 to switch 2 on FOL #1 as shown in FIG. 10.

As will be appreciated by those skilled in the art, the testing of multiple fiber optic links in a transmission and distribution system from a single test point, shown as 60 in FIGS. 8 through 11, can be accomplished using the noise measurement system 62 of the invention, as described above with reference to FIG. 6 and the existing switches in a typical fiber optic transmission and distribution system.

Figure 12:
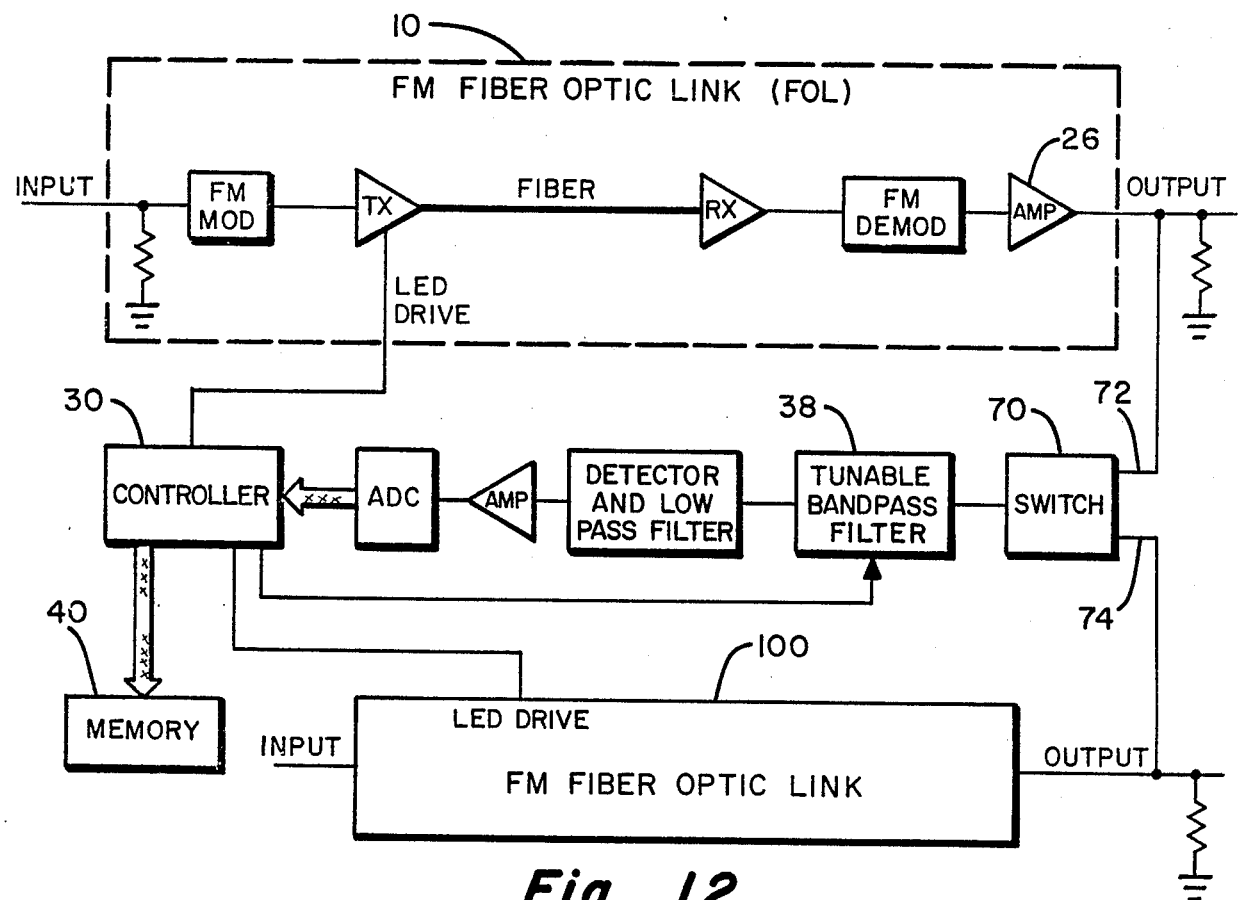
FIG. 12 is a block diagram of one illustrative embodiment of the invention showing an application of the invention wherein the noise performance of separate fiber optic links is compared.

In one embodiment of the system, the controller as shown in FIG. 6 may also store the noise levels associated with each FOL in memory 40. As illustrated in FIG. 12, storing the noise level in memory enables the system to compare the noise levels of several fiber optic lengths. In a system where alternative paths exist for transmitting a signal, the routing system can select the FOL with the lowest noise using the stored noise measurement data. Transmission on the FOLs with the lowest loss will require the lowest transmitter powers. The controller 30 may also compare the present noise level of a FOL with a reference noise level. An increase in noise level above the reference is indicative of link performance and may be used to determine maintenance intervals of the FOL. Noise levels may also be logged in order to determine trends in link performance for maintenance scheduling.

In fiber optic links, required transmitter power is also affected by receiver sensitivity. When an APD is used for a detector, optimum avalanche gain is a sensitive function of temperature. High voltage regulation and set point, being determined mostly by receiver temperature and design, affect the system noise. There is an optimum value of avalanche gain for a given system and temperature. The optimum value is selected by controlling the high voltage input. Thus, system noise measurement can be used to set and regulate avalanche gain in the receiver, as shown in FIG. 6. This can decrease the regulation requirements of the APD high voltage power supply and eliminate the need for sensing receiver temperature or, alternatively, implementing open loop control of the high voltage drive as a function of temperature.

Referring now to FIG. 12 an alternative embodiment of a fiber optic transmission and distribution system using the noise measurement system of the invention is shown. The system in FIG. 12 includes an FM fiber optic link 10 as described above with respect to FIG. 6 and a controller, analog-to-digital converter, amplifier, detector and low pass filter, tunable bandpass filter and memory as employed by the system shown in FIG. 6. Connected between the output of the amplifier 26 and the input of the tunable bandpass filter 38 is a switch 70 with a first and second input, the first input 72 being connected to the output of amplifier 26 and the second input 74 being connected to the output of a second fiber optic link 100 which is comprised of the same type of elements as FOL 10. In such a system, the historic noise parameters for each fiber optic link may be stored in the memory 40 and compared in the controller 30 in order to, for example, optimize the routing of signals through the system at any given point in time. Note that there is only one measurement system for a plurality of fiber optic links. The illustrative example of an embodiment of this system as shown in FIG. 12 is not limited to two such fiber optic links but may, as will be recognized by those skilled in the art, through the use of switches present in a transmission and distribution system, be configured to adapt to a plurality of fiber optic links, such as is exemplified in FIGS. 8 through 11 as described above.

Figure 4:
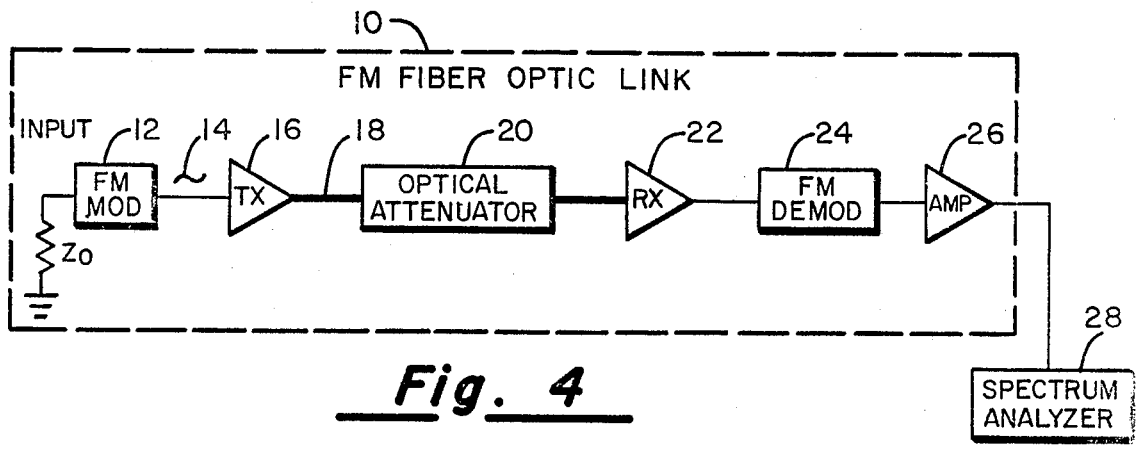
FIG. 4 is a block diagram of one illustrative example of the invention for measuring noise in a fiber optic link.

The test results in FIGS. 1, 2 and 3 were obtained using the experimental setup shown in FIG. 4. The circuit of FIG. 4 comprises a fiber optic link 10 as described above with reference to FIG. 6, but, instead of the noise measurement apparatus of the invention as employed in FIG. 6, a spectrum analyzer 28 is substituted for that noise measurement apparatus. Also, the input to the FM modulator is terminated by impedance $Z_o$ which is a very low impedance source having very low noise. The optical attenuator 20 simulates losses in the fiber optic link path such as the loss from connectors, extra fiber, dirt or contamination on connectors, irregularities such as kinks in the fiber and other physical factors which may cause variations in transmission. As explained above, receiver 22 adds most of the noise to the system and receives the attenuated signal from the optical attenuator 20. The demodulator 24 converts the FM carrier into a base-band signal which, in this example, will be a DC level with the added noise. The added noise from the system has two interesting qualities. First of all, it has a total power. Secondly, the noise of the system has a power spectral distribution of energy which may be as significant as the amount of noise present in the system. The noise acts the same as if a test signal had been introduced into the system in the sense that one can measure the noise which is introduced by the optical attenuation present which alters the transmission levels. By using the noise as a "test signal", one can draw conclusions about the transmission system. FIGS. 1, 2 and 3 show noise measurements on a laboratory fiber optic transmission system with different amounts of optical attenuation introduced into the transmission media. FIG. 7 explains the basic shape of these noise power spectrum measurements because, at different frequencies, there are different indices of modulation. At low frequencies, there are high indices of modulation signified by $\beta_2$. The result of such high indices of modulation is that with very low power in the carrier signal, one can obtain a very high signal-to-noise ratio. In the measurement of the data for FIGS. 1, 2 and 3, by the equipment shown in FIG. 4, the spectrum analyzer was set at a resolution bandwidth of 10 KHz and a video bandwidth of 10 Hz, which corresponds to the tunable bandpass filter and low pass filter, respectively, used in one embodiment of the invention as shown in FIG. 6. In this particular experiment, the spectrum analyzer used was an HP8568B as manufactured by Hewlett Packard Incorporated, although any conventional spectrum analyzer may be employed for duplicating the results of this experiment.

Figure 5:
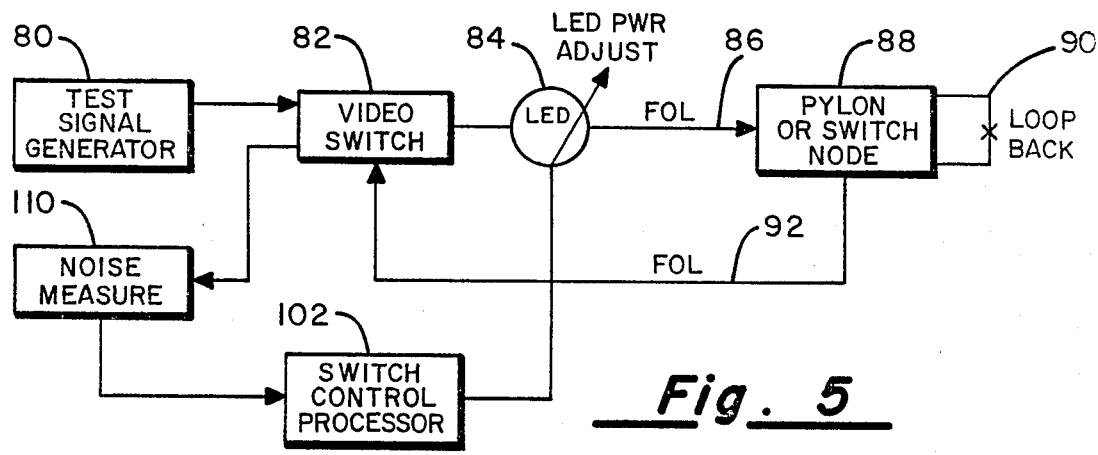
FIG. 5 is a block diagram illustrating active noise measurement of a fiber optic link as employed by the invention.

Now referring to FIG. 5, another alternative application for the noise measurement system of the invention is shown. A configuration similar to the configuration shown in FIG. 5 may be employed to do active noise measurement in a fiber optic link. By sourcing a test signal, for example, from test signal generator 80 into video switch 82 to transmitter 84 which outputs an optical signal at an adjustable power level through FOL 86 into pylon or switch node 88. Switchable loop back 90 may switch back the signal through switch node 88 through FOL 92 and into video switch 82 where it may be routed to noise measurement device 110. Noise measurement device 110 may be apparatus as described with respect to FIG. 6. The results of noise measurement device 110 may then be routed through switch control processor 102 which would operate on the output of noise measurement device 110 to adjust the level of transmission power output by the transmitter 84.

Through employment of a system such as is shown in FIG. 5, one can change the operating conditions of the FM modulator in a fiber optic link and monitor the system noise by introducing a test signal. At the noise measurement apparatus 110, the test signal could be, for example, subtracted out and the noise in the system should remain the same as without the signal. If there is a change in the noise level, this would help to explore a problem in a modulator or demodulator or to locate a fault in a modulator or demodulator in the system, for example. FIG. 5 is intended to show an illustrative example of such an active noise measurement system. Those skilled in the art will readily recognize that many variations of such an active noise measurement system may be deployed as, for example, with a plurality of more than two fiber optic links and a plurality of loop back signals and/or video switches.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. Apparatus for optimizing system performance for use in an FM transmission and signal distribution system which includes at least two fiber optic links both having an output and an input, wherein the transmission and signal distribution system includes a transmitter, comprising:
   (a) means for measuring noise signals coupled to the at least two fiber optic link outputs;
   (b) controlling means coupled to the noise measuring means including:
      (i) means for generating system performance data proportional to the noise signals measured by the noise measurement means wherein the performance data generated includes data pertaining to fiber optic link loss in the at least two fiber optic links,
      (ii) means for comparing data pertaining to fiber optic link loss in at least two fiber optic links wherein the comparing means determines the optimum fiber optic link based on the fiber optic link loss data, and provides a comparison control signal consistent therewith;
   (c) means for storing the generated performance data including the data pertaining to fiber optic link loss, wherein the storing means is coupled to the control means; and
   (d) means coupled to the control means and responsive to the comparison control signal for routing signals according to comparisons of the data pertaining to fiber optic link loss.

2. Apparatus for optimizing system performance for use in FM transmission and signal distribution system which includes at least one fiber optic link having an output and an input, wherein the transmission and signal distribution system includes a transmitter, comprising:
   (a) means for measuring noise signals coupled to the output of the at least one fiber optic link;
   (b) controlling means coupled to the noise measuring means, including:
      (i) means for generating system performance data proportional to the noise signals measured by the noise measurement means wherein the performance data generated includes data pertaining to fiber optic link loss and wherein the performance data generated includes data pertaining to transmitter power,
      (ii) means for controlling the transmission power level wherein the transmission power level controlling means provides transmission control signals to the transmitter and wherein the transmission control signals are consistent with the generated performance data; and
   (c) means coupled to the controlling means for storing the generated performance data.

* * * * *